US012401283B2

(12) United States Patent
Pratap

(10) Patent No.: US 12,401,283 B2
(45) Date of Patent: Aug. 26, 2025

(54) METHOD OF MITIGATING SATURATION IN INTERPHASE TRANSFORMER OF INTERLEAVED SWITCHED MODE POWER SUPPLY DURING STARTUP

(71) Applicant: L3Harris Technologies, Inc., Melbourne, FL (US)

(72) Inventor: Siddharth Pratap, Anaheim, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 302 days.

(21) Appl. No.: 18/105,353

(22) Filed: Feb. 3, 2023

(65) Prior Publication Data

US 2024/0266960 A1   Aug. 8, 2024

(51) Int. Cl.
*H02M 3/158*   (2006.01)

(52) U.S. Cl.
CPC ................................ *H02M 3/1586* (2021.05)

(58) Field of Classification Search
CPC ....... H02M 3/1586; H02M 7/42–5395; H02M 1/36
See application file for complete search history.

(56) References Cited

U.S. PATENT DOCUMENTS

| 5,703,767 A | 12/1997 | Stacey | |
|---|---|---|---|
| 8,860,255 B2 | 10/2014 | Jones et al. | |
| 2007/0253223 A1* | 11/2007 | Neidorff | H02M 1/4216 363/2 |
| 2008/0315982 A1* | 12/2008 | Wei | H02M 7/003 336/155 |
| 2011/0080148 A1* | 4/2011 | Yee | H02M 1/36 323/283 |
| 2014/0268948 A1* | 9/2014 | White | H02M 7/493 363/71 |
| 2022/0387872 A1* | 12/2022 | Beltran | H02M 1/0043 |
| 2024/0090100 A1* | 3/2024 | Kanemitsu | H05B 45/345 |

\* cited by examiner

*Primary Examiner* — Peter M Novak
(74) *Attorney, Agent, or Firm* — Edell, Shapiro & Finnan, LLC

(57) ABSTRACT

A power supply comprises: a first power module and a second power module each coupled to an interphase transformer; and a controller to: apply a first pulse train and a second pulse train to the first power module and the second power module to cause switching of the first power module and the second power module, respectively, to generate a current that flows through the interphase transformer to an output node; and control a phase difference between the first pulse train and the second pulse train by, during a startup period of the power supply, setting the phase difference to zero to cause concurrent switching of the first power module and the second power module that prevents an inrush of the current to the output node from saturating the interphase transformer.

18 Claims, 10 Drawing Sheets

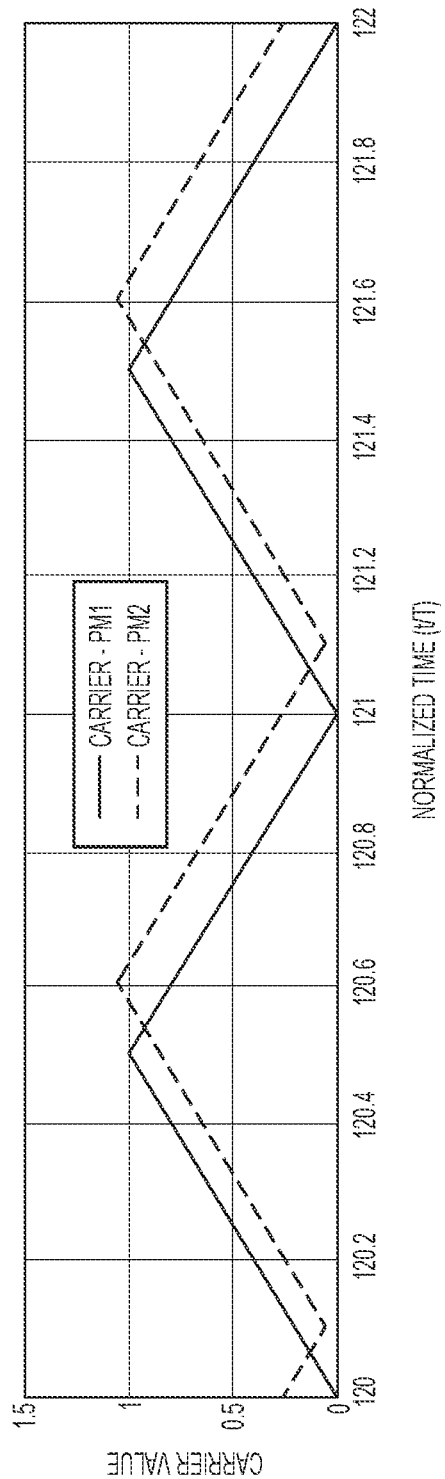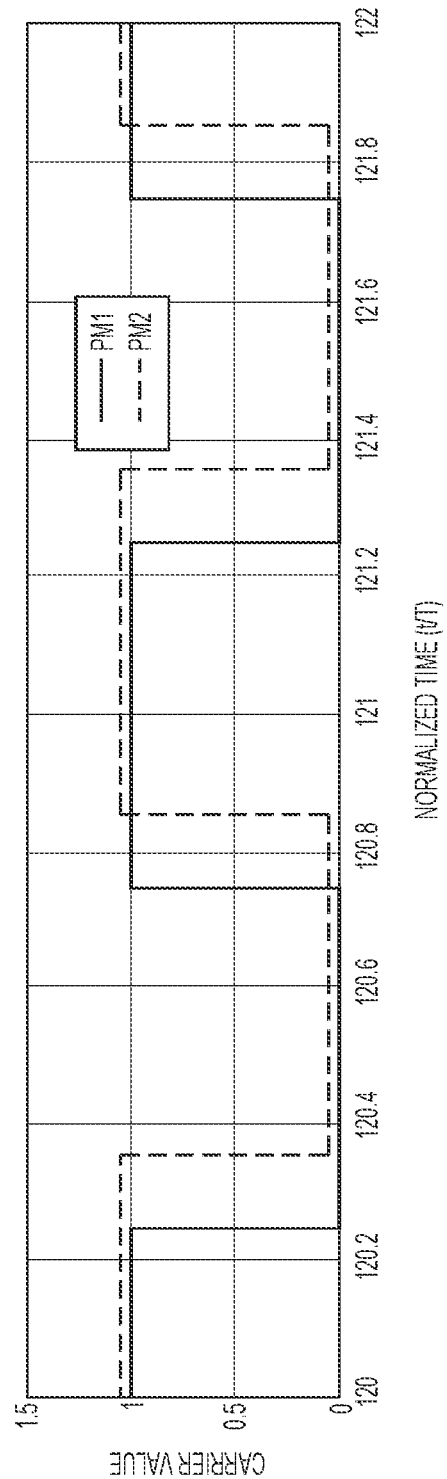

1200

```
┌─────────────────────────────────────────────────────────────┐
│ APPLYING A FIRST PULSE TRAIN AND A SECOND PULSE TRAIN TO    │ 1202
│ A FIRST POWER MODULE AND A SECOND POWER MODULE OF A         │
│ POWER SUPPLY TO CAUSE SWITCHING OF THE FIRST POWER MODULE AND│
│ THE SECOND POWER MODULE, RESPECTIVELY, TO CREATE A CURRENT  │
│ IN AN INTERPHASE TRANSFORMER THAT FLOWS TO AN OUTPUT NODE   │
│ OF THE POWER SUPPLY                                         │
└─────────────────────────────────────────────────────────────┘
                              │
                              ▼
┌─────────────────────────────────────────────────────────────┐
│ CONTROLLING A PHASE DIFFERENCE BETWEEN THE FIRST PULSE TRAIN│ 1204
│ AND THE SECOND PULSE TRAIN BY, DURING A STARTUP PERIOD OF THE│
│ POWER SUPPLY, SETTING THE PHASE DIFFERENCE TO ZERO TO CAUSE │
│ CONCURRENT SWITCHING OF THE FIRST POWER MODULE AND THE SECOND│
│ POWER MODULE THAT PREVENTS AN INRUSH OF THE CURRENT FROM    │
│ SATURATING THE INTERPHASE TRANSFORMER                       │
└─────────────────────────────────────────────────────────────┘
                              │
                              ▼
┌─────────────────────────────────────────────────────────────┐
│ CONTROLLING THE PHASE DIFFERENCE FURTHER INCLUDES, DURING   │ 1206
│ AN ADJUSTMENT PERIOD FOLLOWING THE STARTUP PERIOD,          │
│ GRADUALLY INCREASING THE PHASE DIFFERENCE FROM              │
│ ZERO TO 180°                                                │
└─────────────────────────────────────────────────────────────┘
                              │
                              ▼
┌─────────────────────────────────────────────────────────────┐
│ CONTROLLING THE PHASE DIFFERENCE FURTHER INCLUDES, AFTER THE│ 1208
│ ADJUSTMENT PERIOD, HOLDING THE PHASE DIFFERENCE AT 180°     │
│ TO CAUSE INTERLEAVED SWITCHING OF THE FIRST POWER MODULE    │
│ AND THE SECOND POWER MODULE                                 │
└─────────────────────────────────────────────────────────────┘
```

FIG.12

METHOD OF MITIGATING SATURATION IN INTERPHASE TRANSFORMER OF INTERLEAVED SWITCHED MODE POWER SUPPLY DURING STARTUP

TECHNICAL FIELD

The present disclosure relates generally to controlling switched mode power supplies.

BACKGROUND

An interleaved switched mode power supply (also referred to simply as a "power supply") may include multiple (e.g., two) power modules (PMs) connected in parallel with each other to increase a power rating of the power supply. An arrangement that accomplishes this includes an interphase transformer (IPT) connected to the power modules. The IPT ensures equal sharing of current through parallel paths by providing a high impedance path for circulating currents between the power modules and a low impedance path for current leading to an AC output stage coupled to the power modules through a common mode filter circuit.

The power supply converts an input voltage (also referred to as a "link voltage") supplied by a link capacitor to a common mode voltage that is applied to the AC output stage and the common mode filter circuit. This may be accomplished by switching the power modules at a 50% duty cycle or a modulus of 0.5, to generate the common mode voltage at a level equal to half the link voltage. At startup (i.e., during a cold start), the power supply is de-energized. Thus, capacitors in the common mode filter circuit and the AC output stage are fully discharged. Consequently, when the power modules start to apply the common mode voltage to the capacitors responsive to switching of the power modules, there is a substantial inrush of current to the capacitors. The high current can cause power supply faults that turn off the power supply. The high current also saturates the IPT. The saturated IPT presents a low impedance to current and thus provides an undesired discharge path for the link capacitor.

Switching of the power modules is responsive to switching pulses applied to the power modules. Conventionally, the switching pulses applied to each power module are 180 degrees (i.e., 180°) out-of-phase relative to the switching pulses applied to each other power module during startup. Thus, the switching of each power module is 180° offset relative to the switching of each other power module during startup. Displacing the switching pulses by 180° degrees to achieve the out-of-phase switching is often referred to as interleaving. Interleaving improves a power quality of the AC output waveform; however, interleaving aggravates the problem of saturating the IPT at startup.

BRIEF DESCRIPTION OF THE DRAWINGS

FIG. 7 shows example carrier waves for generating the pulse trains with a phase difference that is between zero and 180 degrees.

FIG. 8 shows example pulse trains with the phase difference that is between zero and 180 degrees as established by the carrier waves of FIG. 7.

FIG. 12 is a flowchart of an example method of controlling the phase difference to prevent interphase transformer saturation during startup and to achieve gradual interphase operation of the power supply.

DESCRIPTION OF EMBODIMENTS

Overview

In an embodiment, a power supply comprises: a first power module and a second power module each coupled to an interphase transformer; and a controller to: apply a first pulse train and a second pulse train to the first power module and the second power module to cause switching of the first power module and the second power module, respectively, to generate a current that flows through the interphase transformer to an output node; and control a phase difference between the first pulse train and the second pulse train by, during a startup period of the power supply, setting the phase difference to zero to cause concurrent switching of the first power module and the second power module that prevents an inrush of the current to the output node from saturating the interphase transformer.

EXAMPLE EMBODIMENTS

Embodiments presented herein control pulse trains applied to power modules of a switched mode power supply to cause switching in the power modules in a way that mitigates saturation of an interphase transformer of the power supply during startup of the power supply, and to achieve interleaved switching gradually. Specifically, the embodiments introduce a time-varying phase difference between different pulse trains applied to different power modules of the power supply to prevent saturating the interphase transformer and then to achieve interleaved operation.

Figure 1:
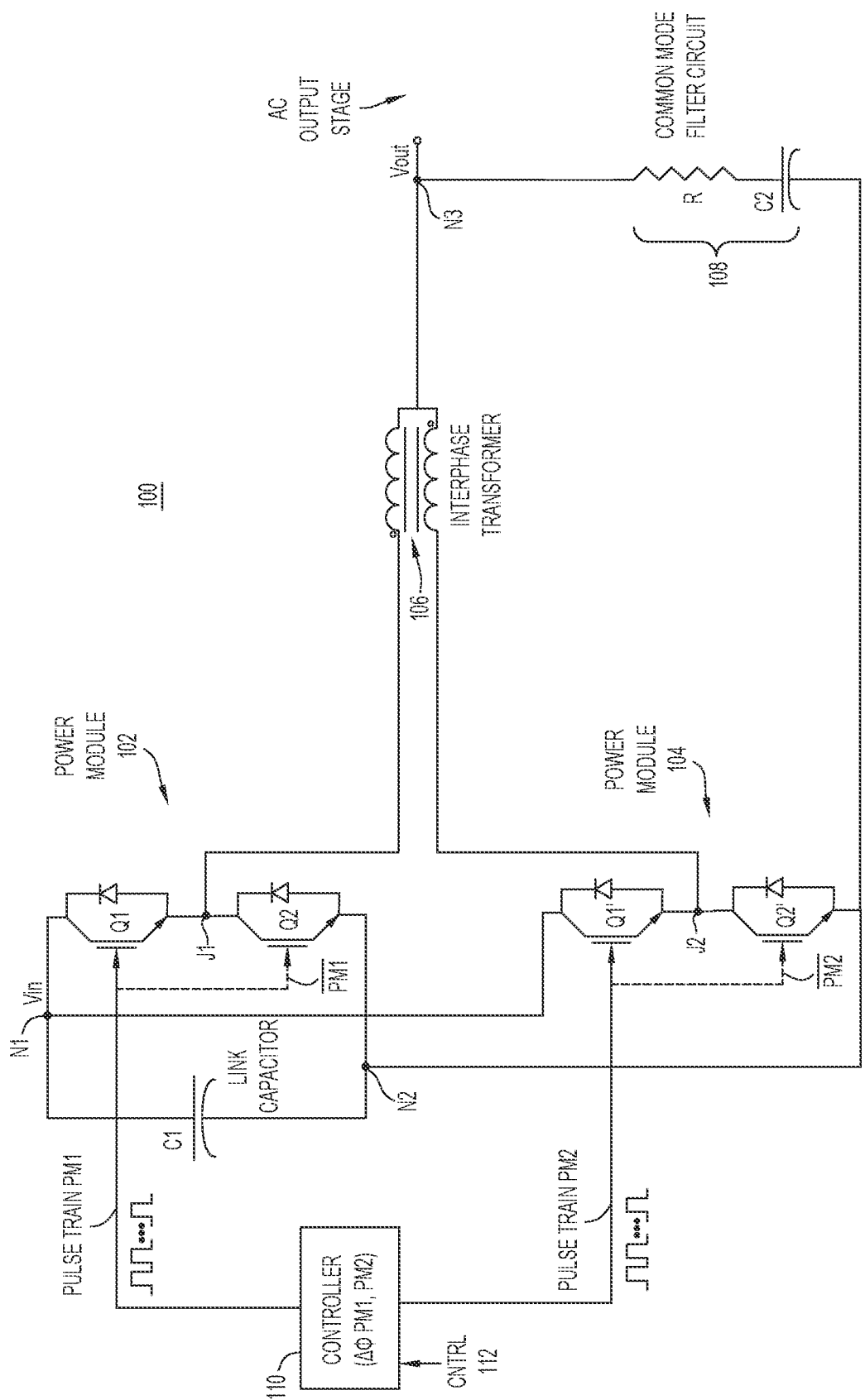
FIG. 1 is a circuit diagram of an example switched mode power supply (also referred to simply as a "power supply") in which embodiments may be implemented.

FIG. 1 is a circuit diagram of an example switched mode power supply 100 (also referred to simply as a "power supply 100") in which the embodiments may be implemented. Power supply 100 includes: a link capacitor C1 coupled to an input node N1 and a return or ground node N2;

a first power module 102 having first complementary switches (Q1, Q2) coupled to N1 and N2 and to each other at a junction J1; a second power module 104 having second complementary switches (Q1', Q2') coupled to N1 and N2 and to each other at a junction J2 to be connected in parallel with the first power module; an interphase transformer (IPT) 106 coupled to the first and second power modules and an output node N3 that provides power to an AC output stage; and a common mode filter circuit 108 coupled to N3 and N2. Power modules 102 and 104 may be referred to as "switching power modules." Q1 and Q2 may be referred to as upper and lower (series-connected) switches. Similarly, Q1' and Q2' may be referred as upper and lower (series-connected) switches. Common mode filter circuit 108 includes a resistor R and a capacitor C2 connected in series with each other and to nodes N2 and N3.

Power supply 100 also includes a controller 110 coupled to first power module 102 and second power module 104. Controller 110 generates and controls a first pulse train PM1 and a second pulse train PM2 responsive to a control signal 112. First and second pulse trains PM1 and PM2 may also be referred to as "switching signals" including a "first switching signal PM1" and a "second switching signal PM2." Controller 110 applies pulse trains PM1 and PM2 (and their complements, $\overline{PM1}$ and $\overline{PM2}$) to power modules 102 and 104, to activate or turn on and turn off the first complementary switches and the second complementary switches of the power modules, respectively. In another arrangement, power modules 102 and 104 may generate the complements of pulse trains PM1 and PM2.

In the ensuing description, components and signals may be referred to by their labels, only. For example, "switch Q1" and "pulse train PM1" may be referred to simply as "Q1" and "PM1," respectively.

In the example arrangement of FIG. 1, Q1 and Q2 have controllable current paths that are connected in series with each other to and between N1 and N2 to form a first leg of first power module 102, and Q1' and Q2' have controllable current paths that are connected in series with each other to and between N1 and N2 to form a first leg of second power module 104. Q1 and Q2 are connected to each other at J1 that is connected to a first side of IPT 106, and Q1' and Q2' are connected to each other at J2 that is connected to a second side of IPT 106. Q1 and Q2 (i.e., the controlled current paths of Q1 and Q2) are switched on and off responsive to pulse train PM1 and its complement $\overline{PM1}$ (i.e., by complementary versions of pulse train PM1) generated by controller 110 and applied to respective control terminals of the switches. Similarly, Q1' and Q2' are switched on and off responsive to second pulse train PM2 and its complement $\overline{PM2}$ generated by controller 110 and applied to respective control terminals of the switches. As described further below, each pulse train has on-times that turn on a given switch to which the pulse train is applied and off-times that turn off the given switch. That is, each pulse train comprises a sequence of pulses (i.e., the on-times) that turn on the given switch.

In an example, each switch Qi includes a switching transistor (i.e., a transistor configured as a switch), such as an insulated-gate bipolar transistor (IGBT) having a collector-emitter current path and a gate to control the current path. Other types of current switching transistors may be used.

At a high-level, power supply 100 converts an input voltage Vin (also referred to as a "link voltage") applied to N1 by link capacitor C2 to an AC output voltage Vout at output node N3 responsive to on-off switching of (Q1, Q2) and on-off switching of (Q1', Q2') caused by pulse trains PM1 and PM2, respectively. Power supply 100 provides output voltage Vout to the AC output stage coupled to output node N3. Common mode filter circuit 108 filters output voltage Vout at output node N3. In accordance with embodiments presented herein, controller 110 controls a phase difference $\Delta\varphi$ between pulse trains PM1 and PM2 as a function of time (or as a function of a number of switching cycles of the pulse trains) from a startup of power supply 100 to a steady state operation of power supply 100 responsive to control signal 112, to (i) avoid saturation of IPT 106 during startup, and (ii) gradually achieve interleaved operation during the steady state operation. That is, controller 110 imposes a time-varying phase difference between pulse trains PM1 and PM2 during startup until the steady state is achieved. Control signal 112 may indicate time periods for startup and steady state operation of power supply 100, to enable controller 110 to control the phase difference as described below during the time periods.

Figure 2:
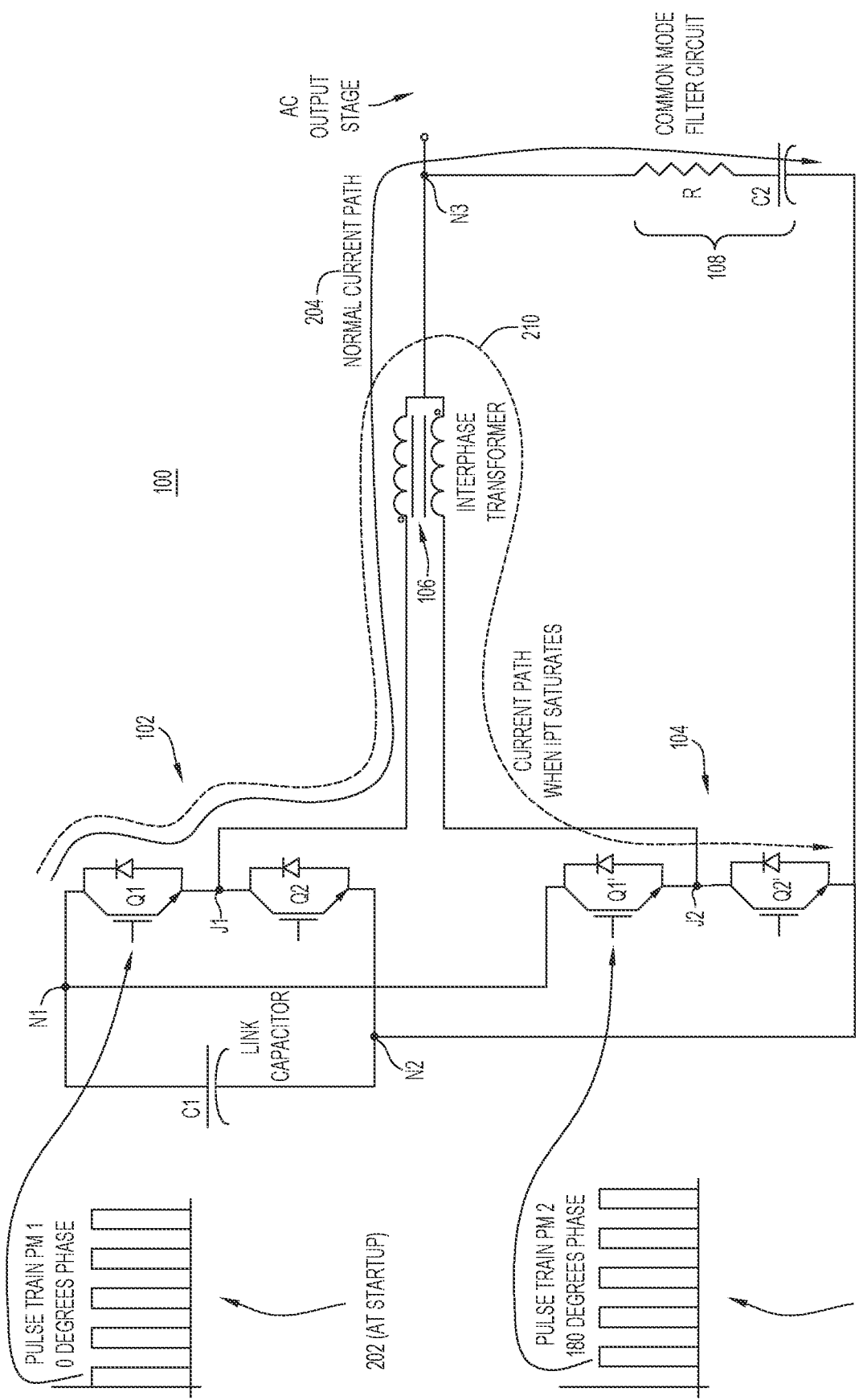
FIG. 2 is an illustration of a conventional startup configuration for pulse trains, applied to power modules of the power supply during startup, that causes interphase transformer saturation in the power supply.

FIG. 2 is an illustration of a conventional startup configuration (i.e., startup phase difference) 202 for pulse trains PM1 and PM2 applied to power modules 102 and 104 during startup of the power supply 100, which results in undesired saturation of IPT 106. Each pulse train PMi has a modulus of 0.5 or a 50% duty cycle. In conventional startup configuration 202, pulse trains PM1 and PM2 are complementary at startup of power supply 100. That is, pulse trains PM1 and PM2 are out of phase relative to each other by 180°, i.e., the phase difference $\Delta\varphi$ between the pulse trains is 180°. Interleaving pulse trains PM1 and PM2 in this manner improves the power quality of output voltage Vout during steady state, but aggravates the problem of saturating IPT 106 at/during startup, as described below.

At startup, C2 is fully discharged. Under startup switching of (Q1, Q2) and (Q1', Q2') responsive to complementary pulse trains PM1 and PM2 as configured according to conventional startup configuration 202, power modules 102 and 104 convert input voltage Vin to output voltage Vout (roughly half the input voltage) and apply the same to common mode filter circuit 108. As a result, normal current starts to flow through IPT 106 along a normal path 204 to charge C2. The normal current rises quickly to a saturation limit of IPT 106, at which point the IPT is saturated and has a low impedance. When the normal current reaches the saturation limit, the current shifts to a short-circuit current path 210 that short circuits, and discharges, C1.

Figure 3:
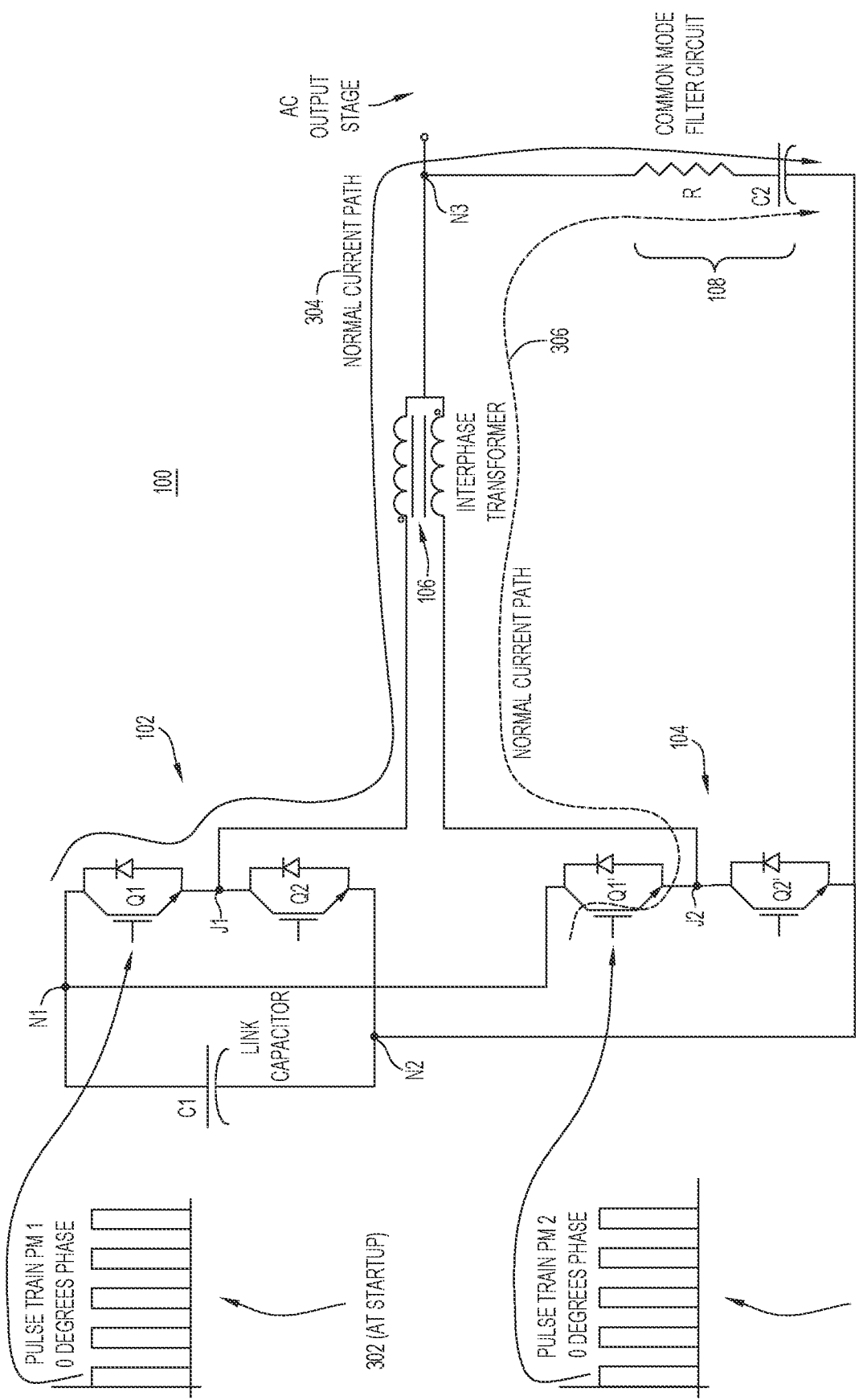
FIG. 3 is an illustration of an example startup configuration of pulse trains, applied to power modules of the power supply during startup of the power supply, used to prevent interphase transformer saturation, according to an embodiment.

FIG. 3 is an illustration of a startup configuration (i.e., startup phase difference) 302 for pulse trains PM1 and PM2 applied to power modules 102 and 104 during startup of the power supply 100, according to embodiments presented herein. Startup configuration 302 of pulse trains PM1 and PM2 prevents undesired saturation of IPT 106 during startup. According to startup configuration 302, controller 110 starts pulse trains PM1 and PM2 with the same phase for multiple initial (synchronized) switching cycles of the pulse trains so that the pulse trains are time-aligned and thus time-synchronized with each other for the initial switching cycles. Each pulse train PMi has a modulus of 0.5 or a 50% duty cycle and, during the initial switching cycles, the phase difference $\Delta\varphi$ between pulse trains PM1 and PM2 is zero. Accordingly, the on-times (i.e., pulses) and off-times of pulse train PM1 are time-aligned or coincide with the on-times (i.e., pulses) and off-times of pulse train PM2, respectively.

When synchronized pulse trains PM1 and PM2 switch upper switches (Q1 and Q1') on and off concurrently and switch lower switches (Q2 and Q2') on and off concurrently during startup, power modules 102 and 104 concurrently supply balanced currents along respective, parallel, normal current paths 304 and 306 to C2 through IPT 106. For example, the concurrent on-times of pulse trains PM1 and PM2 turn on upper switches Q1 and Q1' at the same time, while the concurrent off-times of the pulse trains turn off the upper switches at the same time. The parallel currents produce equal and opposite flux in IPT 106 and thereby prevent the IPT from saturating during startup. This ensures that the common mode inrush current during startup energizes both legs/sides of IPT 106 equally and oppositely thus avoiding IPT saturation. An added benefit is that the initial inrush current is shared between power modules 102 and 104.

After the initial switching cycles have completed, when the currents have charged C2 to approximately half of input voltage Vin, controller 110 gradually increases a phase shift between pulse trains PM1 and PM2 from zero to 180° over multiple switching cycles following the initial multiple switching cycles. That is, after a startup time period spanning the initial multiple switching cycles, controller 110 gradually increases the phase difference Δφ between pulse trains PM1 and PM2 from zero to 180° over an adjustment time period spanning the multiple switching cycles following the initial multiple switching cycles. When the phase difference Δφ reaches 180° at the end of the adjustment period, controller 110 then maintains the phase difference at 1800 indefinitely so that the pulse trains are fully interleaved. This is steady state operation.

Timing control for varying the phase difference during the startup time period and the adjustment time period as described above may be provided by control signal 112.

Figure 4:
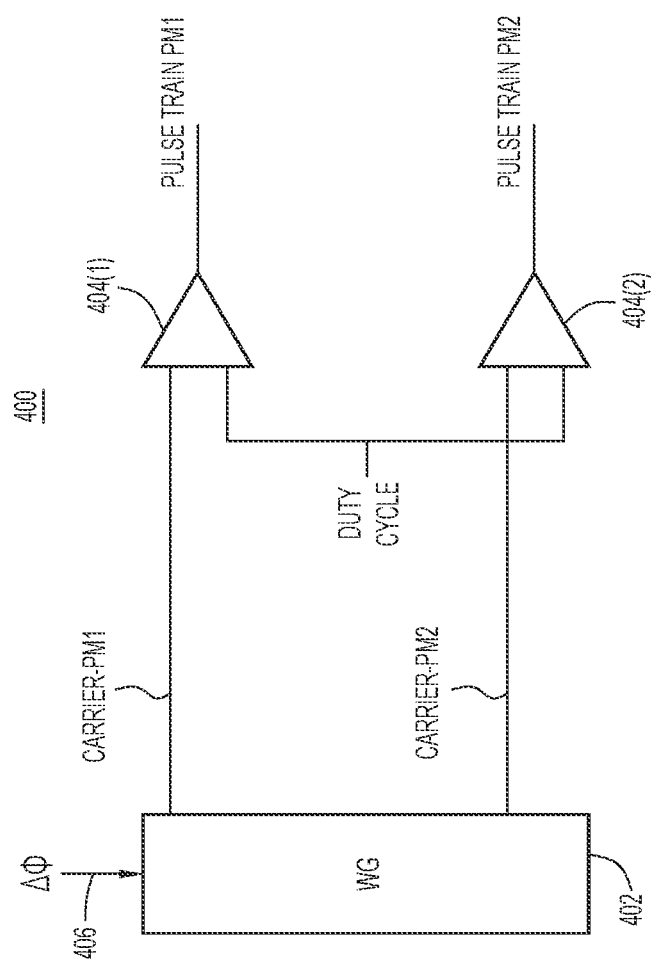
FIG. 4 is a block diagram of a pulse train generator implemented by a controller of the power supply.

FIG. 4 is a block diagram of an example pulse train generator 400 implemented by controller 110. Pulse train generator 400 includes a wave generator (WG) 402, a first comparator 404(1), and a second comparator 404(2). Wave generator 402 generates a first carrier wave carrier-PM1 for pulse train PM1 and a second carrier wave carrier-PM2 for pulse train PM2 each having a frequency equal to an intended switching frequency for each of pulse trains PM1 and PM2. Wave generator 402 receives a control signal 406 indicative of phase difference Δφ, and introduces the phase difference between carrier-PM1 and carrier-PM2 responsive to the control signal. Each carrier wave may be a triangle waveform, or any other waveform that cycles above and below a mid-level during a cycle or period of the waveform.

Wave generator 402 provides carrier-PM1 and carrier-PM2 to comparators 404(1) and 404(2), respectively. Each comparator 404(i) (e.g., 404(1)) receives a carrier value that is representative of a desired duty cycle (e.g., 50%) or modulus (e.g., 0.5) for pulse trains PM1 and PM2, and compares a magnitude of carrier-PMi (e.g., carrier-PM1) to the carrier value over time, i.e., across each cycle of the carrier wave, and produces pulse train PMi (e.g., PM1) based on the comparison. Specifically, when the magnitude of carrier-PMi is less than the carrier value, comparator 404(i) produces an on-time of pulse train PMi, and when the magnitude is equal to or greater than the carrier value, the comparator produces an off-time of pulse train PMi. Pulse train PMi has a switching frequency equal to the frequency of carrier-PMi.

Controller 110 introduces a phase shift or phase difference between carrier-PM1 and carrier-PM2 to introduce the same phase shift between pulse trains PM1 and PM2. At startup, controller 110 sets the phase shift (i.e., phase difference) between carrier-PM1 and carrier-PM2 equal to zero, so that pulse trains PM1 and PM2 are time-aligned and in phase. Controller 110 maintains the zero phase offset for a few milliseconds during the startup period. After the startup period when capacitor C2 is charged, during the adjustment period, controller 110 gradually introduces an increasing non-zero phase shift (i.e., non-zero phase difference) between carrier-PM1 and carrier-PM2 from zero until the phase shift reaches 180° when power supply 100 reaches its steady state. After that, the phase shift is maintained at 180°.

FIGS. 5-10 show how example carrier-PM1 and carrier-PM2 (and example pulse trains PM1 and PM2 correspondingly) change or shift in phase relative to each other from startup to a final state corresponding to steady state. In the examples of FIGS. 5-10, the carrier value is set to 0.5 to generate pulse trains PM1 and PM2 with a 50% duty cycle. In FIGS. 5-10, "gate pulses" refer to pulses of pulse trains PM1 and PM2 applied to the gates of corresponding switches.

Figure 5:
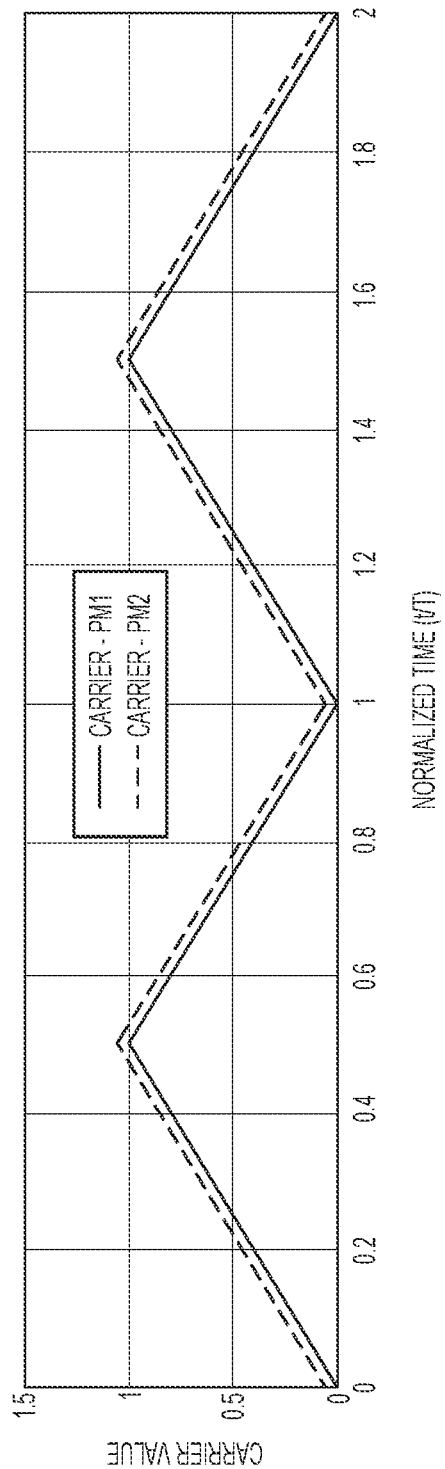
FIG. 5 shows example carrier waves for generating the pulse trains with a phase difference of zero.

FIG. 5 shows example carrier waves carrier-PM1 and carrier-PM2 with a phase difference equal to zero at/during startup.

Figure 6:
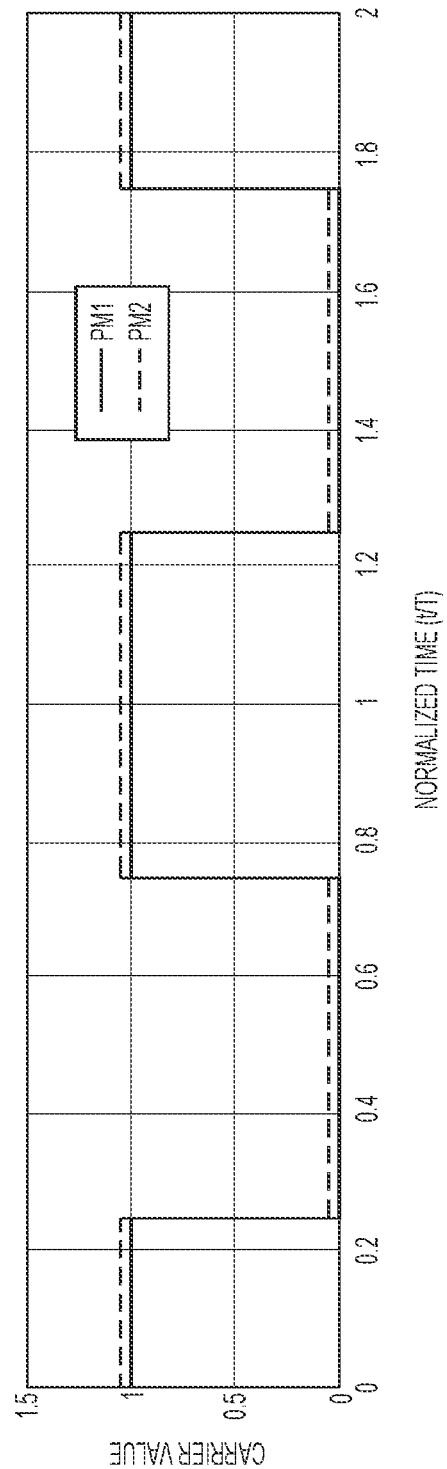
FIG. 6 shows example pulse trains with the phase difference equal to zero as established by the carrier waves of FIG. 5.

FIG. 6 shows example pulse trains PM1 and PM2 with the phase difference equal to zero at startup established by the carrier waves of FIG. 5.

FIG. 7 shows example carrier waves carrier-PM1 and carrier-PM2 with a phase difference that is between zero and 180° established during the adjustment period after startup.

FIG. 8 shows example pule trains PM1 and PM2 with the phase difference that is established by the carrier waves of FIG. 7.

Figure 9:
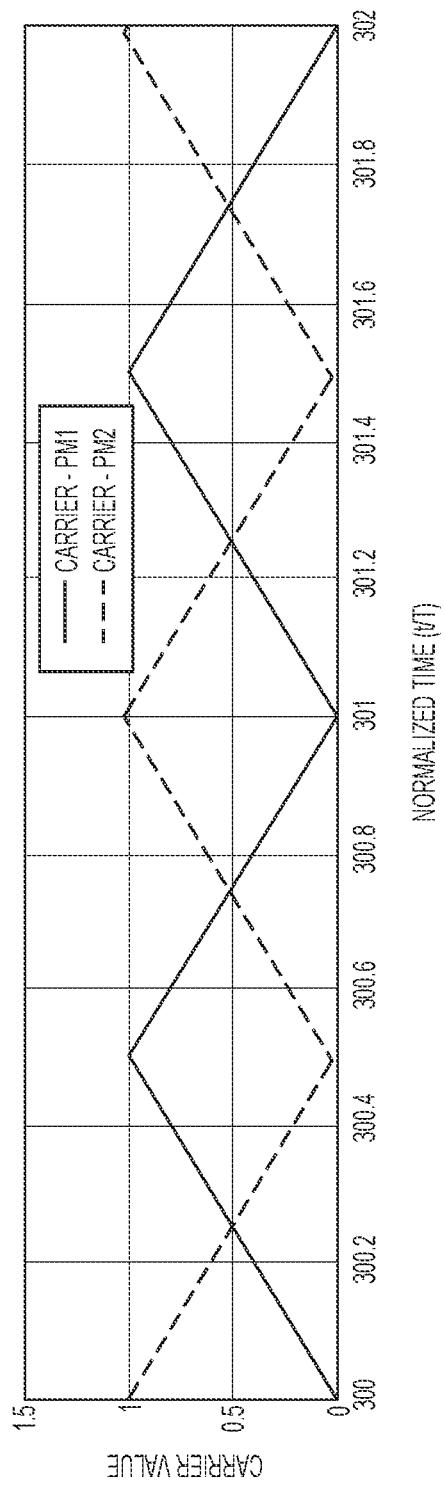
FIG. 9 shows example carrier waves for generating the pulse trains with a phase difference of 180 degrees.

FIG. 9 shows example carrier waves carrier-PM1 and carrier-PM2 with a phase difference=180° established at the end of the adjustment period, and held during steady state.

Figure 10:
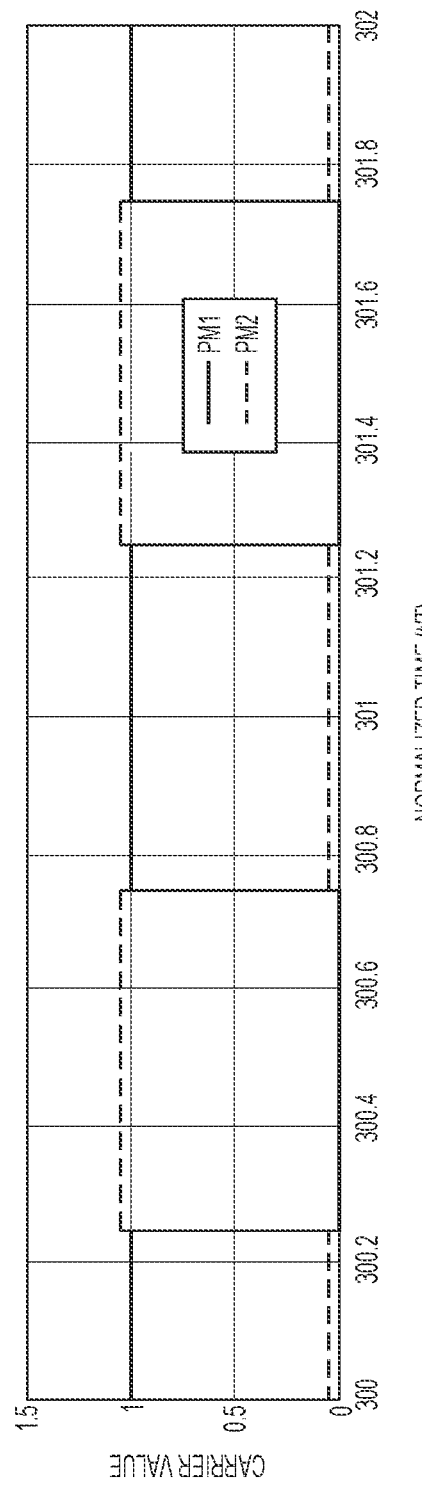
FIG. 10 shows example pulse trains with the phase difference of 180 degrees as established by the carrier waves of FIG. 9.

FIG. 10 shows example pule trains PM1 and PM2 with the phase difference established according to the phase difference of FIG. 9.

A formulaic treatment for controlling the phase difference is now described. Assume a nominal switching frequency=$F_{sw}$ Hz. The phase difference is set to zero for the startup period (e.g., a few milliseconds). A few milliseconds after switching has started (i.e., after a few switching cycles during which the phase difference is held to zero), a $\Delta F_{sw}$ Hz increase/decrease in the nominal switching frequency is introduced for a pre-determined duration $T_A$ (i.e., the adjustment period) in one of the power modules connected to the IPT. That results in a $\Delta F_{sw}$ cycles/second·360°/cycle·$T_A$ seconds=180° phase shift between the two carriers over the adjustment period. After choosing the duration of the increased frequency or the increase in frequency, the other is then determined by the formula to deliver a 180° phase shift. This method can be applied to any even number of parallel power modules (see below). During the adjustment period, the phase shift may increase linearly with time, for example.

Figure 11:
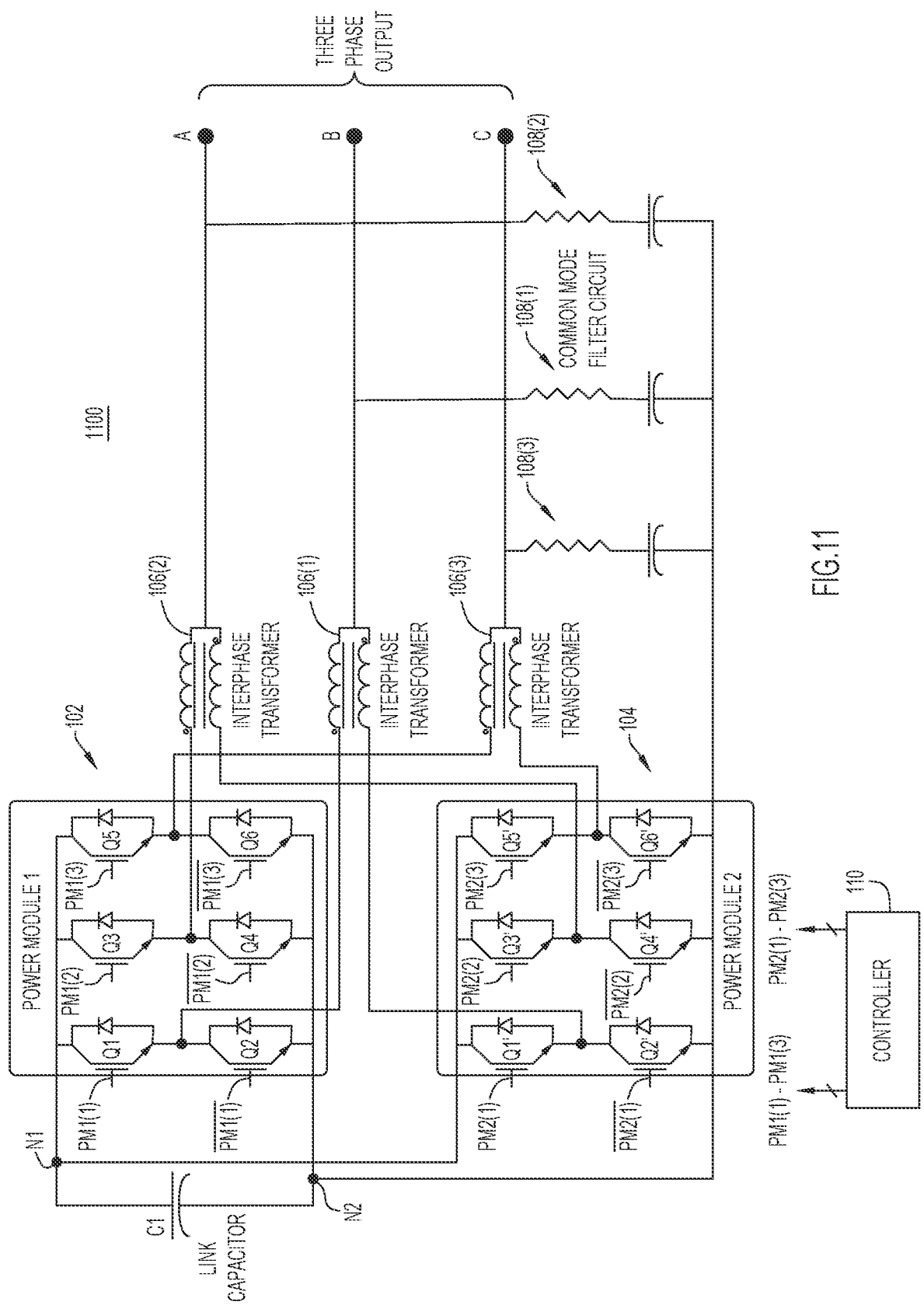
FIG. 11 is a circuit diagram of an example multiphase power supply in which embodiments may be implemented.

FIG. 11 is a circuit diagram of an example multiphase power supply 1100 implemented accordance to embodiments presented herein. Multiphase power supply 1100 replicates circuitry and operation of power supply 100 three times to produce a three phase output at terminals A-C. In the example of FIG. 11, power module 102 is expanded to include series-connected switches (Q1, Q2), (Q3, Q4) and (Q5, Q6) respectively connected to IPTs 106(1), 106(2), and 106(3), and configured to receive pulse trains (PM1(1), $\overline{PM1(1)}$), (PM1(2), $\overline{PM1(2)}$), and (PM1(3), $\overline{PM1(3)}$) generated by controller 110, respectively. Similarly, power module 104 is expanded to include series-connected switches (Q1', Q2'), (Q3', Q4') and (Q5', Q6') respectively connected to IPTs 106(1), 106(2), and 106(3), and configured to receive pulse trains (PM2(1), $\overline{PM2(1)}$), (PM2(2), $\overline{PM2(2)}$), and (PM2(3), $\overline{PM1(3)}$), respectively, generated by controller 110. Multiphase power module 1000 includes common mode filter circuits 108(1), 108(2), and 108(3) respectively connected to IPTs 106(1), 106(2), and 106(3) and phase outputs B, A, and C.

Controller 110 controls the phase differences between pulse train pair (PM1(1), PM2(1)), pulse train pair (PM1(2), PM2(2)), and pulse train pair (PM1(3), PM2(3)) similarly to the way the controller controls the phase difference between pulse train pair (PM1, PM2), except that the controller sets a fixed phase difference between the different pulse train pairs to match the phases used by the three phase output.

FIG. 12 is a flowchart of an example method 1200 of controlling pulse trains applied to power modules 102 and 104 in power supply 100. Power module 102 has series-connected first complementary switches, including a first upper switch Q1 and a first lower switch Q2. Power module 104 has series-connected second complementary switches, including a second upper switch Q1' and a second lower switch Q2'. The first complementary switches and the second complementary switches are connected to opposing sides of interphase transformer 106, which in turn is coupled to output node N3. The operations of method 1200 described below are based at least in part on the preceding description.

Prior to power-on/startup of power supply, power modules 102 and 104 are not switching on and off because no pulse trains are applied to the power modules. Thus, power supply 100 is de-energized such that capacitive loads coupled to output node N3 are fully discharged.

At startup, at 1202, controller 110 applies complementary versions of first pulse train PM1 to the first complementary switches and applies complementary versions of second pulse train PM2 to the second complementary switches to cause first complementary switching of the first complementary switches and second complementary switching of the second complementary switches, respectively, to generate a current that flows through the interphase transformer to the output node. When applied to a given switch, an on-time and an off-time of a given pulse train switches the given switch on and off.

At 1204, controller 110 controls a phase difference between the first pulse train and the second pulse train (and thus between the first complementary versions of the first pulse train and the second complementary versions of the second pulse train) in the following manner. During an initial startup period (e.g., over multiple initial switching cycles of the pulse trains), controller 110 sets the phase difference to zero to cause switching of the first power module and switching of the second power module concurrently with the switching of the first power module. In this arrangement, upper transistors Q1 and Q1' switch on and off concurrently (i.e., at the same time) and lower transistors Q2 and Q2' switch on and off at the same time. This prevents an inrush of the current (generated by the concurrently switched first and second power modules) flowing to the output node from saturating the interphase transformer. Power modules 102 and 104 supply concurrent balanced currents along respective, parallel, normal current paths to the output node, which presents IPT saturation.

At 1206, during an adjustment period following the startup period (e.g., for multiple switching cycles of the pulse trains after the initial multiple switching cycles), controller 110 gradually increases the phase difference from zero to 180°.

At 1208, after the adjustment period (e.g., once the phase difference of 180° is achieved), controller 110 holds or maintains the phase difference at 1800 indefinitely to achieve interleaved switching of the power modules. This represents steady state operation of power supply 100.

Figure 13:
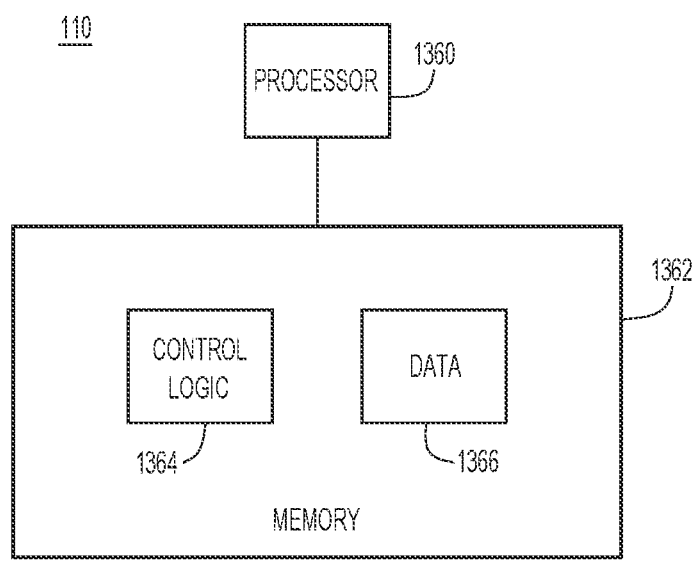
FIG. 13 is a block diagram of an example controller of the power supply.

FIG. 13 is a block diagram of controller 110 according to an embodiment. Controller 110 includes processor(s) 1360 and a memory 1362. The aforementioned components may be implemented in hardware, software, or a combination thereof. Memory 1362 stores control software 1364 (referred as "control logic"), that when executed by the processor(s) 1360, causes the processor(s), and more generally, controller 110, to perform the various operations described herein for power supply 100. The processor(s) 1360 may be a microprocessor or microcontroller (or multiple instances of such components). The memory 1362 may include read only memory (ROM), random access memory (RAM), magnetic disk storage media devices, optical storage media devices, flash memory devices, electrical, optical, or other physically tangible (i.e., non-transitory) memory storage devices. Controller 110 may also be discrete logic embedded within an integrated circuit (IC) device.

Thus, in general, the memory 1362 may comprise one or more tangible (non-transitory) computer readable storage media (e.g., memory device(s)) encoded with software or firmware that comprises computer executable instructions. For example, control software 1364 includes logic to implement operations of performed by the controller 110. Thus, control software 1364 implements the various methods/operations described herein.

In addition, memory 1362 stores data 1366 used and produced by control software 1364.

In summary, in some aspects, the techniques described herein relate to a power supply including: a first power module, a second power module, and an interphase transformer coupled to the first power module, the second power module, and an output node; and a controller to: apply a first pulse train and a second pulse train to the first power module and the second power module to cause switching of the first power module and the second power module, respectively, to generate a current that flows through the interphase transformer to the output node; and control a phase difference between the first pulse train and the second pulse train by, during a startup period of the power supply, setting the phase difference to zero to cause concurrent switching of the first power module and the second power module that prevents an inrush of the current to the output node from saturating the interphase transformer.

In some aspects, the techniques described herein relate to a power supply, wherein setting the phase difference to zero results in time-aligning an on-time and an off-time of the first pulse train with an on-time and an off-time of the second pulse train.

In some aspects, the techniques described herein relate to a power supply, wherein the controller is further configured to control the phase difference by, during an adjustment period following the startup period, gradually increasing the phase difference from zero to 180°.

In some aspects, the techniques described herein relate to a power supply, wherein the controller is configured to gradually increase the phase difference by increasing a first switching frequency of the first pulse train relative to a second switching frequency of the second pulse train.

In some aspects, the techniques described herein relate to a power supply, wherein the controller is further configured to control the phase difference by, after the adjustment period, holding the phase difference at 180° to cause interleaved switching of the first power module and the second power module.

In some aspects, the techniques described herein relate to a power supply, wherein: the first power module and the second power module respectively include first complementary switches and second complementary switches; and the controller is configured to apply first complementary versions of the first pulse train to the first complementary switches to cause first complementary switching of the first complementary switches, and apply second complementary versions of the second pulse train to the second complementary switches to cause second complementary switching of the second complementary switches.

In some aspects, the techniques described herein relate to a power supply, wherein: the first complementary switches include first upper and lower switches and the second complementary switches include second upper and lower switches; and when the phase difference is zero, the first complementary versions of the first pulse train and the second complementary versions of the second pulse train cause switching on and off of the first upper and lower switches concurrent with switching on and off of the second upper and lower switches, respectively.

In some aspects, the techniques described herein relate to a power supply, wherein the controller is configured to generate the first pulse train and the second pulse train by: comparing a first carrier wave to a carrier value to produce an on-time and an off-time of the first pulse train; and comparing a second carrier wave to the carrier value to produce an on-time and an off-time of the second pulse train.

In some aspects, the techniques described herein relate to a power supply, wherein the controller is configured to control the phase difference by controlling a phase difference between the first carrier wave and the second carrier wave.

In some aspects, the techniques described herein relate to a power supply, wherein the first pulse train and the second pulse train each have a duty cycle equal to 50%.

In some aspects, the techniques described herein relate to a power supply, wherein, prior to the startup period, the first power module and the second power module are not switching and the power supply is de-energized.

In some aspects, the techniques described herein relate to a power supply, further including a filter coupled to the output node, the filter including a capacitor that is discharged prior to the startup period, wherein the inrush of the current that flows to the output node flows charges the capacitor.

In some aspects, the techniques described herein relate to a method of controlling a power supply having a first power module and a second power module coupled to an interphase transformer, including: applying a first pulse train and a second pulse train to the first power module and the second power module to cause switching of the first power module and the second power module, respectively to generate a current in the interphase transformer that flows to an output node; and controlling a phase difference between the first pulse train and the second pulse train by, during a startup period of the power supply, setting the phase difference to zero to cause concurrent switching of the first power module and the second power module that prevents an inrush of the current from saturating the interphase transformer.

In some aspects, the techniques described herein relate to a method, wherein setting the phase difference to zero results in time-aligning an on-time and an off-time of the first pulse train with an on-time and an off-time of the second pulse train.

In some aspects, the techniques described herein relate to a method, wherein controlling the phase difference further includes, during an adjustment period following the startup period, gradually increasing the phase difference from zero to 180°.

In some aspects, the techniques described herein relate to a method, wherein gradually increasing the phase difference includes increasing a first switching frequency of the first pulse train relative to a second switching frequency of the second pulse train.

In some aspects, the techniques described herein relate to a method, wherein controlling the phase difference further includes, after the adjustment period, holding the phase difference at 180° to cause interleaved switching of the first power module and the second power module.

In some aspects, the techniques described herein relate to a method, wherein applying includes: applying complementary versions of the first pulse train to first complementary switches of the first power module to cause first complementary switching of the first complementary switches; and applying complementary versions of the second pulse train to second complementary switches of the second power module to cause second complementary switching of the second complementary switches.

In some aspects, the techniques described herein relate to a method, further including generating the first pulse train and the second pulse train by: comparing a first carrier wave to a carrier value to produce an on-time and an off-time of the first pulse train; and comparing a second carrier wave to the carrier value to produce an on-time and an off-time of the second pulse train.

In some aspects, the techniques described herein relate to a method, wherein controlling the phase difference between the first pulse train and the second pulse train includes controlling a phase difference between the first carrier wave and the second carrier wave.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A power supply comprising:
    a first power module, a second power module, and an interphase transformer having opposing sides respectively coupled to the first power module and the second power module; and
    a controller to:
        apply a first pulse train and a second pulse train to the first power module and the second power module to cause switching of the first power module and the second power module, respectively, to generate a current that flows through the interphase transformer to an output node; and
        responsive to a control signal configured to indicate a startup period and a steady state operation of the power supply, control a phase difference between the first pulse train and the second pulse train by:
            during the startup period, setting the phase difference to zero to cause concurrent switching of the first power module and the second power module to supply concurrent balanced currents into the opposing sides of the interphase transformer, which prevents an inrush of the current to the output node from saturating the interphase transformer; and during an adjustment period following the startup period, gradually increasing the phase difference from zero to 180°.

2. The power supply of claim 1, wherein setting the phase difference to zero results in time-aligning an on-time and an off-time of the first pulse train with an on-time and an off-time of the second pulse train.

3. The power supply of claim 1, wherein the controller is configured to gradually increase the phase difference by frequency sliding a first switching frequency of the first pulse train relative to a second switching frequency of the second pulse train.

4. The power supply of claim 1, wherein the controller is further configured to control the phase difference by, after the adjustment period, holding the phase difference at 180° to cause interleaved switching of the first power module and the second power module.

5. The power supply of claim 1, wherein:
the first power module and the second power module respectively include first complementary switches and second complementary switches; and
the controller is configured to apply first complementary versions of the first pulse train to the first complementary switches to cause first complementary switching of the first complementary switches, and apply second complementary versions of the second pulse train to the second complementary switches to cause second complementary switching of the second complementary switches.

6. The power supply of claim 5, wherein:
the first complementary switches include first upper and lower switches and the second complementary switches include second upper and lower switches; and
when the phase difference is zero, the first complementary versions of the first pulse train and the second complementary versions of the second pulse train are configured to cause switching on and off of the first upper and lower switches concurrent with switching on and off of the second upper and lower switches, respectively.

7. The power supply of claim 1, wherein the controller is configured to generate the first pulse train and the second pulse train by:
comparing a first carrier wave to a carrier value to produce an on-time and an off-time of the first pulse train; and
comparing a second carrier wave to the carrier value to produce an on-time and an off-time of the second pulse train.

8. The power supply of claim 7, wherein the controller is configured to control the phase difference by controlling a phase difference between the first carrier wave and the second carrier wave.

9. The power supply of claim 1, wherein the first pulse train and the second pulse train each have a duty cycle equal to 50%.

10. The power supply of claim 1, wherein, prior to the startup period, the first power module and the second power module are not switching and the power supply is de-energized.

11. The power supply of claim 1, further comprising a filter coupled to the output node, the filter including a capacitor that is discharged prior to the startup period, wherein the inrush of the current that flows to the output node flows charges the capacitor.

12. A method of controlling a power supply having a first power module and a second power module respectively coupled to opposing sides of an interphase transformer, comprising:
applying a first pulse train and a second pulse train to the first power module and the second power module to cause switching of the first power module and the second power module, respectively to generate a current in the interphase transformer that flows to an output node; and
responsive to a control signal configured to indicate a startup period and a steady state operation of the power supply, controlling a phase difference between the first pulse train and the second pulse train by:
during the startup period, setting the phase difference to zero to cause concurrent switching of the first power module and the second power module to supply concurrent balanced currents into the opposing sides of the interphase transformer, which prevents an inrush of the current from saturating the interphase transformer; and
during an adjustment period following the startup period, gradually increasing the phase difference from zero to 180°.

13. The method of claim 12, wherein setting the phase difference to zero results in time-aligning an on-time and an off-time of the first pulse train with an on-time and an off-time of the second pulse train.

14. The method of claim 12, wherein gradually increasing the phase difference includes frequency sliding a first switching frequency of the first pulse train relative to a second switching frequency of the second pulse train.

15. The method of claim 12, wherein controlling the phase difference further includes, after the adjustment period, holding the phase difference at 180° to cause interleaved switching of the first power module and the second power module.

16. The method of claim 12, wherein applying includes:
applying complementary versions of the first pulse train to first complementary switches of the first power module to cause first complementary switching of the first complementary switches; and
applying complementary versions of the second pulse train to second complementary switches of the second power module to cause second complementary switching of the second complementary switches.

17. The method of claim 12, further comprising generating the first pulse train and the second pulse train by:
comparing a first carrier wave to a carrier value to produce an on-time and an off-time of the first pulse train; and
comparing a second carrier wave to the carrier value to produce an on-time and an off-time of the second pulse train.

18. The method of claim 17, wherein controlling the phase difference between the first pulse train and the second pulse train includes controlling a phase difference between the first carrier wave and the second carrier wave.

* * * * *